(12) United States Patent
Onello et al.

(10) Patent No.: US 10,035,244 B2
(45) Date of Patent: Jul. 31, 2018

(54) PORTABLE WORK HOLDING DEVICE AND ASSEMBLY

(71) Applicant: JPW Industries Inc., LaVergne, TN (US)

(72) Inventors: Timothy Scott Onello, Murfreesboro, TN (US); Charles Weber, Onalaska, WI (US)

(73) Assignee: JPW Industries Inc., LaVergne, TN (US)

( * ) Notice: Subject to any disclaimer, the term of this patent is extended or adjusted under 35 U.S.C. 154(b) by 438 days.

(21) Appl. No.: 14/733,531

(22) Filed: Jun. 8, 2015

(65) Prior Publication Data

US 2015/0266164 A1    Sep. 24, 2015

Related U.S. Application Data

(63) Continuation of application No. 13/301,359, filed on Nov. 21, 2011, now Pat. No. 9,079,464.

(51) Int. Cl.
| | |
|---|---|
| *B25B 1/00* | (2006.01) |
| *B25B 1/24* | (2006.01) |
| *B25B 1/10* | (2006.01) |
| *B60D 1/58* | (2006.01) |

(52) U.S. Cl.
CPC ............ *B25B 1/2405* (2013.01); *B25B 1/103* (2013.01); *B60D 1/58* (2013.01); *Y10T 29/4984* (2015.01); *Y10T 29/49826* (2015.01)

(58) Field of Classification Search
CPC ................. B25B 1/00; B25B 3/00; B25B 7/00
See application file for complete search history.

(56) References Cited

U.S. PATENT DOCUMENTS

| 196,380 A | 10/1877 | Parker |
|---|---|---|
| 742,096 A | 10/1903 | Long |
| 1,765,321 A | 6/1930 | Bodmer |

(Continued)

FOREIGN PATENT DOCUMENTS

EP    0073361 A3    4/1984

OTHER PUBLICATIONS

Mac's Tie Downs, The Ultimate Mobile Workbench: Mac's Trail D-Vise, Dec. 18, 2009, a video of length 4 minutes and 12 seconds, available on www.youtube.com at https://youtu.be/PZSlSnnJl_k , Still image captures of the video are shown in Appendix C.

(Continued)

*Primary Examiner* — Lee D Wilson
(74) *Attorney, Agent, or Firm* — Waller Lansden Dortch & Davis, LLP; Blake M. Bernard

(57) ABSTRACT

A work holding device includes a first jaw piece having an elongated first connection member for connecting the work holding device to a support. The first connection member defines a first passage. A second jaw piece has an elongated second connection member positionable within the first passage. The second connection member defines a second passage in communication with the first passage. A spindle assembly movably couples the second jaw piece to the first jaw piece. The spindle assembly is configured to move the second jaw piece with respect to the first jaw piece to create a clamping pressure when an object is placed between the first jaw piece and the second jaw piece.

26 Claims, 7 Drawing Sheets

(56) References Cited

U.S. PATENT DOCUMENTS

| | | | |
|---|---|---|---|
| 2,139,292 A | 12/1938 | Tramsak | |
| 2,841,035 A | 7/1958 | Simpson | |
| 3,081,995 A | 3/1963 | Fujii | |
| 3,206,224 A | 9/1965 | Bock et al. | |
| 4,040,613 A | 8/1977 | Kartasuk et al. | |
| D282,143 S | 1/1986 | Tarquinio | |
| 4,659,102 A | 4/1987 | Stuhrmann et al. | |
| 4,807,863 A * | 2/1989 | Yang | B25B 1/103 |
| | | | 269/153 |
| 4,885,453 A | 12/1989 | Martin | |
| 4,971,301 A | 11/1990 | Yang | |
| 5,433,356 A * | 7/1995 | Russell | B25B 1/24 |
| | | | 224/519 |
| 5,522,287 A | 6/1996 | Chiang | |
| 5,527,146 A | 6/1996 | Allsop et al. | |
| 5,658,119 A | 8/1997 | Allsop et al. | |
| 5,803,941 A | 9/1998 | Berkhoel et al. | |
| 5,881,937 A | 3/1999 | Sadler | |
| 5,950,617 A | 9/1999 | Lorenz | |
| 6,135,435 A | 10/2000 | Schmitz | |
| 7,017,898 B2 | 3/2006 | Varzino et al. | |
| 7,036,807 B1 | 5/2006 | Gasparyan et al. | |
| 7,293,765 B2 * | 11/2007 | Hooper | B25B 1/103 |
| | | | 269/246 |
| 7,673,861 B2 | 3/2010 | Meholovitch et al. | |
| 7,775,530 B2 | 8/2010 | Darling, III | |
| D652,703 S | 1/2012 | Onello et al. | |
| 8,109,494 B1 | 2/2012 | Warth | |
| D680,843 S | 4/2013 | Onello et al. | |
| D707,096 S | 6/2014 | Zhang et al. | |
| 9,079,464 B2 * | 7/2015 | Onello | B25B 1/103 |
| 2003/0201290 A1 | 10/2003 | Clausen | |
| 2005/0082730 A1 | 4/2005 | Murray et al. | |
| 2006/0049566 A1 | 3/2006 | Bernstein | |
| 2009/0183585 A1 | 7/2009 | Huang et al. | |
| 2010/0072240 A1 | 3/2010 | Cornes | |
| 2010/0320666 A1 | 12/2010 | Teo | |
| 2012/0043711 A1 | 2/2012 | Schmidt | |
| 2013/0127104 A1 * | 5/2013 | Onello | B25B 1/103 |
| | | | 269/99 |

OTHER PUBLICATIONS

McMaster-Carr Supply Company, Repair Parts for Wilton Bench Vises, Document 5298AAC, Nov. 24, 2012, one page, located at the internet site www.PBase.com, The 914-6 GT Project, Shop Tools, 4" Wilton Bullet Vise, Vintage, link to document http://www.pbase.com/914gt/mage/147527443, printed Mar. 30, 2017.

Ernie Lopez, Heavy Duty, Lightweight Hitch-Mounted Vise—Trail D-Vise from Mac's Custom Tie-Downs, Baggers Magazine, posted on Mar. 10, 2010, five pages, posted to website www.baggersmag.com, link to article http://www.baggersmag.com/heavy-duty-lightweight-hitch-mounted-vise, printed Apr. 7, 2017.

* cited by examiner

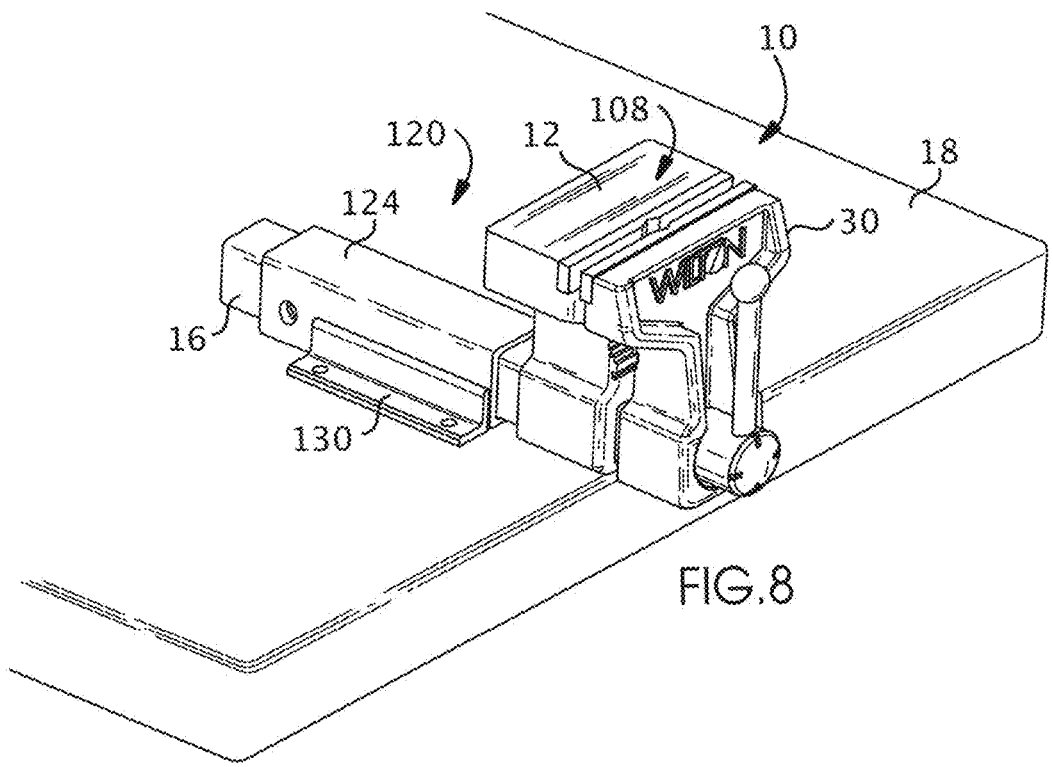
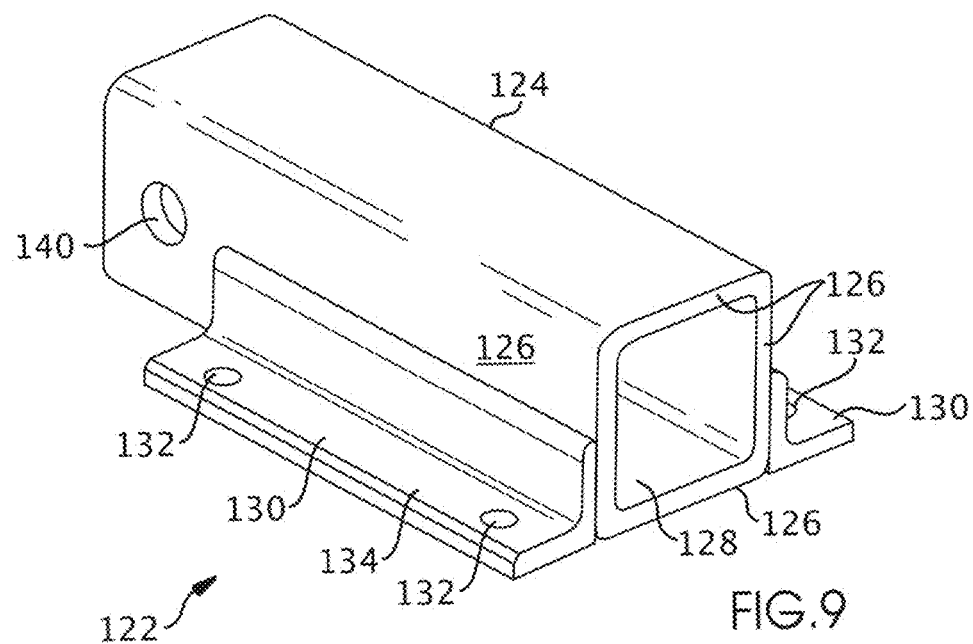

PORTABLE WORK HOLDING DEVICE AND ASSEMBLY

CROSS-REFERENCE TO RELATED APPLICATION

This application is a Continuation Patent Application of co-pending U.S. patent application Ser. No. 13/301,359, filed Nov. 21, 2011, which is incorporated herein by reference.

BACKGROUND

The subject matter disclosed herein relates generally to a work holding device, such as a vise, and, more particularly, to a portable work holding device configured to removably mount to a support, for example, a vehicle receiver hitch or a support surface, such as a table or work bench.

Attempts have been made in the past to attach a vise to work trucks or vehicles by taking an existing bench vise and mounting the bench vise to a platform or a pad on the vehicle. While this creates a work holding device, the conventional bench vise is not designed to be portable and, as such, is heavy and difficult to transport. Other attempts to make work holding devices more portable have resulted in a work holding device that compromises the work holding capabilities of a conventional bench vise. In both of these cases, an undesirable tradeoff is made for either portability or for function.

SUMMARY

In one aspect, a work holding device includes a first jaw piece having an elongated first connection member for connecting the work holding device to a support. The first connection member defines a first passage. A second jaw piece has an elongated second connection member positionable within the first passage. The second connection member defines a second passage in communication with the first passage. A spindle assembly movably connects the second jaw piece to the first jaw piece. The spindle assembly is configured to move the second jaw piece with respect to the first jaw piece to create a clamping pressure when an object is placed between the first jaw piece and the second jaw piece.

In another aspect, a portable work holding device includes a stationary first jaw piece having a casting and an elongated first connection member extending from the casting. The first connection member defines a first passage. A movable second jaw piece has an elongated second connection member extending from the second jaw piece. The second connection member is positionable within the first passage to couple the second jaw piece to the first jaw piece. The second connection member defines a second passage in communication with the first passage with the second connection member positioned within the first passage. A spindle assembly movably couples the second jaw piece to the first jaw piece. The spindle assembly includes a spindle nut positioned within at least the first passage. The spindle nut forms a helical thread on an inner surface of the spindle nut along at least a portion of a length of the spindle nut between a first end and a second end of the spindle nut. A spindle forms a helical thread on an outer surface of the spindle along at least a portion of a length of the spindle that cooperates with the helical thread formed on the inner surface of the spindle nut to facilitate translation of the second jaw piece with respect to the first jaw piece along an axis defined by the spindle.

In yet another aspect, a portable work holding device assembly includes a work holding device and a plate assembly. The work holding device includes a first jaw piece having an elongated connection member for connecting the work holding device to a support, a second jaw piece, and a spindle assembly movably connecting the second jaw piece to the first jaw piece. The spindle assembly includes a threaded spindle rotatable to move the second jaw piece with respect to the first jaw piece. The plate assembly includes a member having a plurality of walls defining a passage with a complementary cross-section to receive the first connection member. One or more brackets are coupled to a corresponding wall of the plurality of walls of the member. The one or more brackets each define one or more apertures to facilitate coupling the work holding device to a support surface.

In yet another aspect, a method of assembling a work holding device includes providing a stationary first jaw piece having a casting and an elongated first connection member extending from the casting, wherein the first connection member defines a first passage. An elongated second connection member of a movable second jaw piece is positioned within the first passage. The second connection member defines a second passage in communication with the first passage. A spindle assembly is positioned within the first passage and the second passage to movably couple the second jaw piece to the first jaw piece.

BRIEF DESCRIPTION OF THE DRAWINGS

FIG. 8 is a perspective view of an exemplary work holding assembly coupled to a support, such as a work bench; and FIG. 9 is a perspective view of a plate assembly of the work holding assembly shown in FIG. 8.

DETAILED DESCRIPTION

The embodiments described herein relate to a work holding device, such as a vise, that is capable of being quickly mounted to a vehicle using the vehicle receiver hitch as a connection point. The work holding device can also be mounted to a bracket that is fixed to a suitable support surface, such as a table or a work bench, utilizing an elongated connection member also used for mounting the work holding device to the vehicle receiver hitch. In one embodiment, the work holding device includes a fixed or stationary jaw piece, that includes a casting and the elongated connection member, and a movable jaw piece that is operatively connected to the stationary jaw piece by a spindle assembly that moves the movable jaw piece with respect to the stationary jaw piece to generate or create a pressure when an object is paced between the stationary jaw piece and the movable jaw piece. In one embodiment, the work holding device includes a handle having a single fixed arm that can be fixed or locked in a desired position, for example, in a twelve o'clock position, for storing the work holding device on the vehicle while the vehicle is being driven. In one embodiment, a recess is formed in the casting of the stationary jaw piece that allows for weight reduction, as well as a handle feature to facilitate portability. A work surface or an anvil is formed on at least the stationary jaw piece and is raised above the jaw pieces to create a more useable work surface while the work holding device is mounted to the vehicle.

Referring to FIGS. 1-9, in one embodiment a portable work holding assembly includes a work holding device, such as a vise, having a first jaw piece and an elongated first connection member for removably connecting the work holding device to a support, such as a vehicle receiver hitch or a support surface. A second jaw piece has an elongated second connection member that is positionable within a passage defined by the first connection member, and that defines a second passage in communication with the first passage. A spindle assembly is positioned within the first and second passages to movably couple the second jaw piece to the first jaw piece to facilitate translation of the second jaw piece with respect to the first jaw piece.

Figure 1:
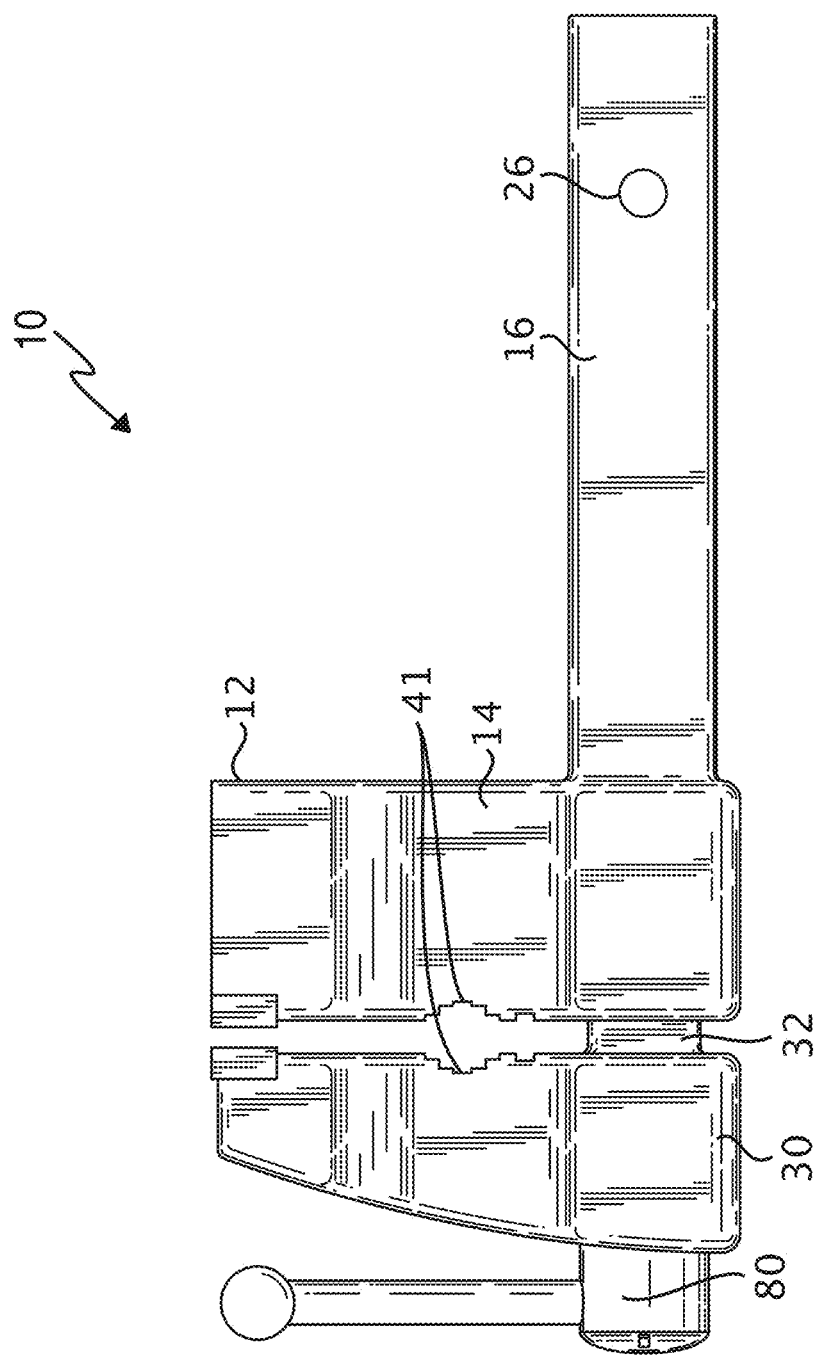
FIG. 1 is front plan view of an exemplary work holding device.
Figure 2:
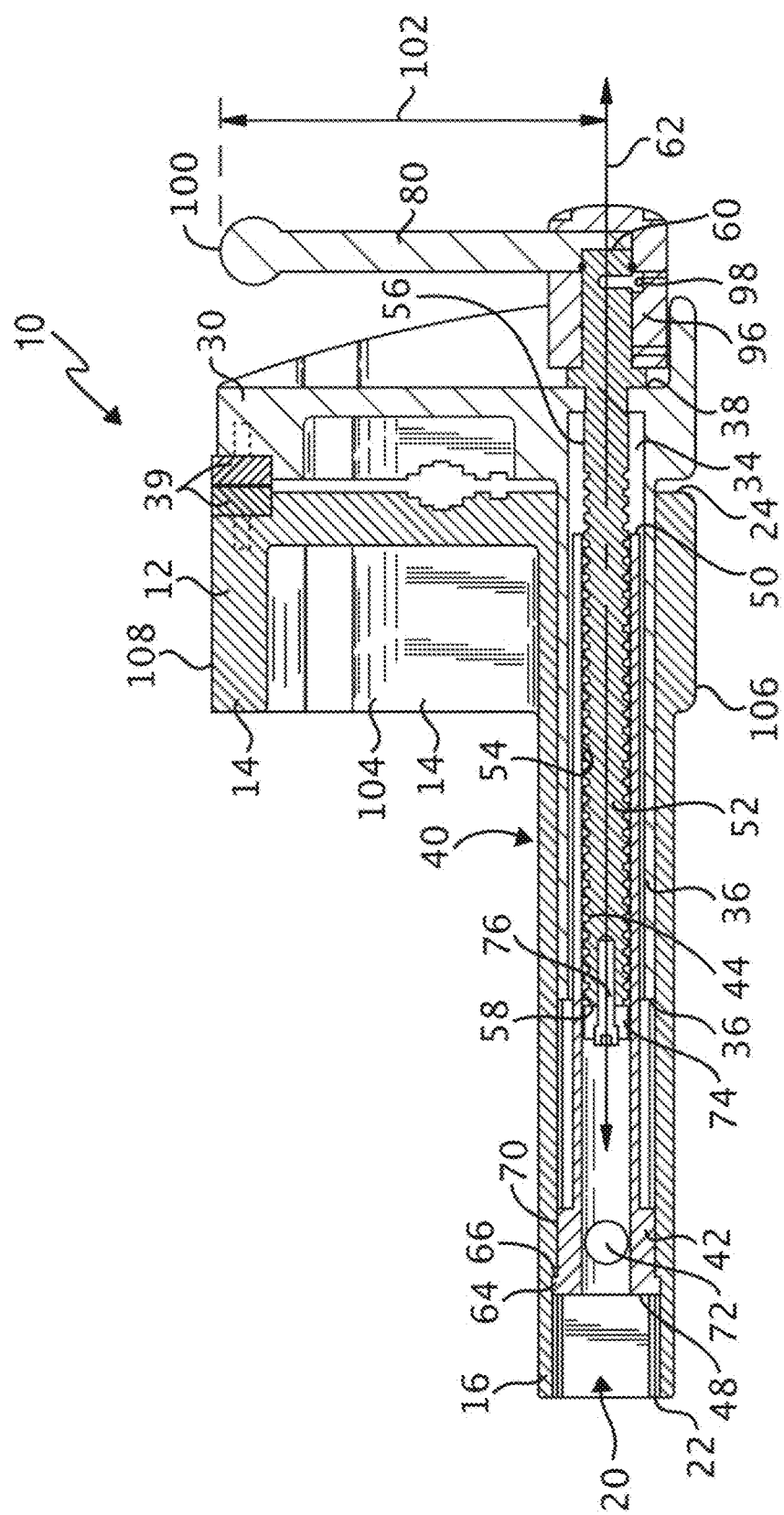
FIG. 2 is a cross-section view of the work holding device shown in FIG. 1.
Figure 7:
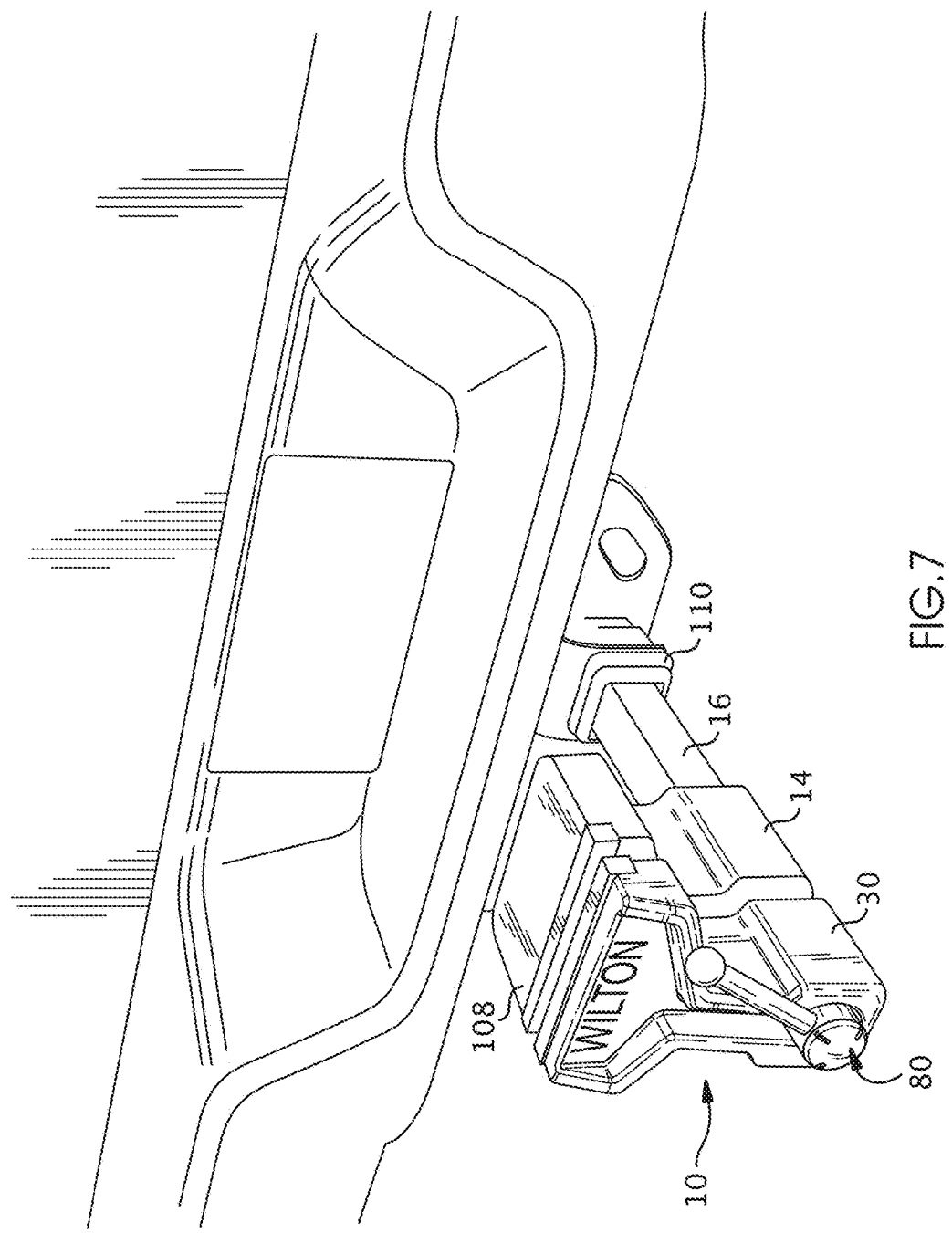
FIG. 7 is a perspective view of an exemplary work holding device coupled to a vehicle receiver hitch.

Referring further to FIGS. 1 and 2, an exemplary portable work holding device 10, such as a vise, includes a stationary first jaw piece 12 having a casting 14 and an elongated first connection member 16 extending from a first end of casting 14 for connecting work holding device 10 to a support 18 (shown in FIGS. 7 and 8, for example). First connection member 16 defines a first passage 20, as shown in FIG. 2, that extends between a second end 22 and an opposing first end 24 of first connection member 16. First connection member 16 is configured to be inserted into and received within a receiver hitch on a vehicle, as shown in FIG. 7, or a plate assembly for mounting on a surface, such as a table or workbench, as shown in FIGS. 8 and 9 and described in greater detail below. Referring to FIG. 1, an aperture 26 is defined through opposing lateral sides of first connection member 16. With work holding device 10 inserted into a vehicle receiver hitch, for example, a pin (not shown) is removably positioned within aperture 26 to facilitate coupling work holding device 10 to the vehicle receiver hitch. In a particular embodiment, a nut (not shown) is coupled to first connection member 16, such as by one or more spot welds or another suitable method, and is threadedly engageable with the pin to fixedly couple first jaw piece 12 to the vehicle receiver hitch.

A movable second jaw piece 30 includes an elongated second connection member 32 extending from a first end of second jaw piece 30. Second connection member 32 is positionable at least partially within first passage 20 to couple second jaw piece 30 to first jaw piece 12. As shown in FIG. 2, second connection member 32 defines a second passage 34 that extends between a second end 36 and an opposing first end 38. Second passage 34 is in communication with first passage 20 with second connection member 32 positioned within first passage 20. In one embodiment, a jaw member 39 made of a suitably durable and strong material, such as steel, is coupled to first jaw piece 12 and/or second jaw piece 30 and configured to secure an object placed between first jaw piece 12 and second jaw piece 30. In a particular embodiment, jaw member(s) 39 are removable and replaceable.

In one embodiment, work holding device 10 includes a spindle assembly 40 movably connecting second jaw piece 30 to first jaw piece 12. Spindle assembly 40 is configured to move second jaw piece 30 with respect to first jaw piece 12 to create a clamping pressure on an object when the object is placed between first jaw piece 12 and second jaw piece 30. For example, a work piece, such as a pipe, may be positioned within pipe jaws 41, and spindle assembly 40 moves second jaw piece 30 with respect to first jaw piece 12 to provide a suitable clamping pressure to maintain the work piece properly positioned between pipe jaws 41. In one embodiment, pipe jaws 41 are stepped to receive different sized pipes or objects.

Spindle assembly 40 includes a spindle nut 42 positioned within at least first passage 20. With second connection member 32 positioned within first connection member 16, spindle nut 42 extends through first passage 20 and into second passage 34, as shown in FIG. 2. A helical thread 44 is formed on at least a portion of an inner surface 46 of spindle nut 42 between a first end 48 and an opposing second end 50 of spindle nut 42.

Spindle assembly 40 also includes a spindle 52 operatively coupled to spindle nut 42. A complementary helical thread 54 is formed on at least a portion of an outer surface 56 of spindle 52 along a length of spindle 52 between a first end 58 and an opposing second end 60 of spindle 52. Helical thread 54 cooperates with helical thread 44 formed on inner surface 46 of spindle nut 42 to facilitate translation of second jaw piece 30 with respect to first jaw piece 12 along an axis 62 defined along a length of spindle 52, as shown in FIG. 2. In one embodiment, spindle assembly 40 forms a seal within first passage 20 and second passage 34 to prevent or limit debris, such as dust, from entering first passage 20 and/or second passage 34.

In one embodiment, spindle nut 42 forms one or more tabs 64 at first end 48 that interfere with a shoulder or ledge 66 formed on an inner surface 68 of first connection member 16 to prevent decoupling of second jaw piece 30 from first jaw piece 12. In the exemplary embodiment, a continuous, circumferential tab 64 is formed around an outer surface 70 of spindle nut 42. In alternative embodiments one or more discontinuous tabs 64 are formed on outer surface 70 of spindle nut 42. Further, as shown in FIG. 2, an aperture 72 defined through first end 48 of spindle nut 42 aligns with aperture 26 to retain spindle nut 42 properly positioned within first passage 20 and to facilitate coupling work holding device 10 to a receiver with a pin positioned through aperture 26 and aperture 72.

In one embodiment, a stop block 74 is coupled to first end 58 of spindle 52. Stop block 74 is configured to allow spindle 52 to move along axis 62 within an intended travel range, while preventing second jaw piece 30 from extending outside the intended travel range and decoupling from first jaw piece 12. As shown in FIG. 2, a bolt 76 removably couples stop block 74 to first end 58 of spindle 52. If the user needs to separate second jaw piece 30 from first jaw piece 12, the user, through first end 22 of first passage 20, can access bolt 76 that holds stop block 74 to remove bolt 76 from spindle nut 42. With bolt 76 and stop block 74 removed from within first connection member 16, spindle nut 42 can be removed from within first connection member 16 to dissemble spindle assembly 40.

Figure 3:
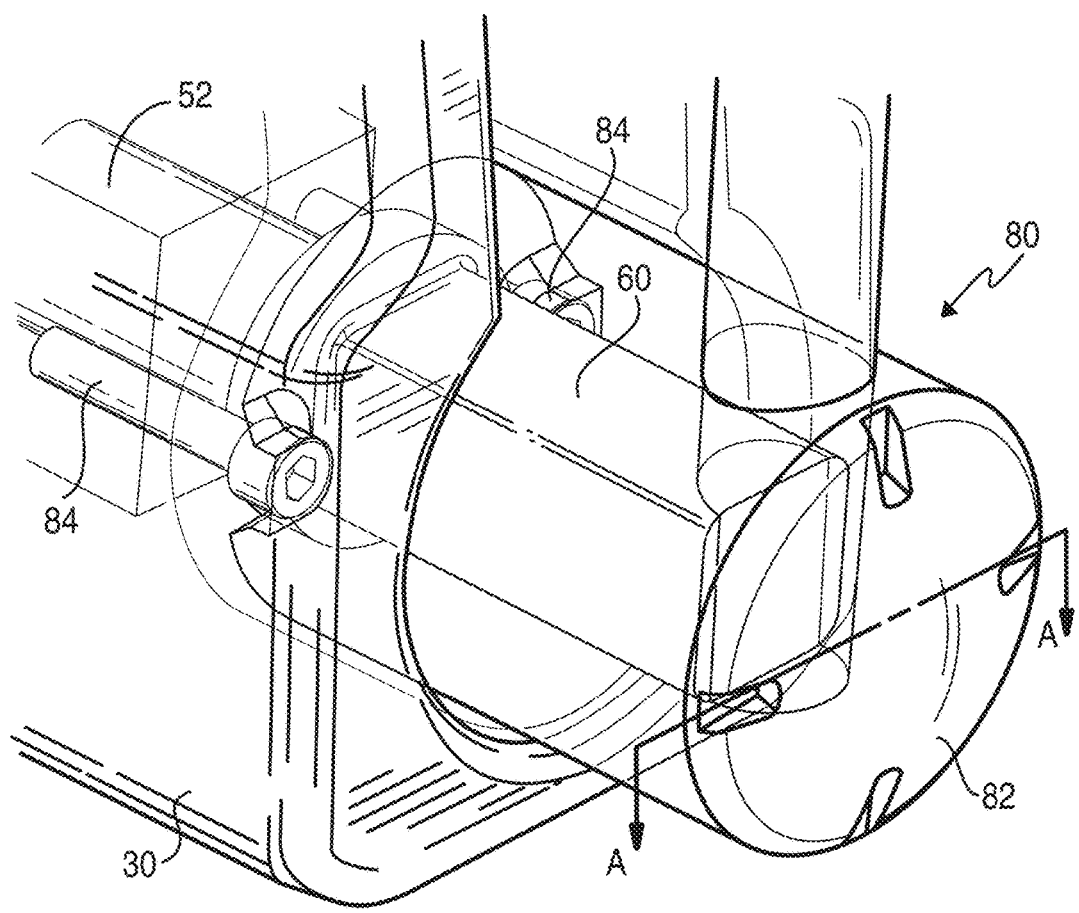
FIG. 3 is a perspective view of a portion of the work holding device shown in FIG. 1.
Figure 4:
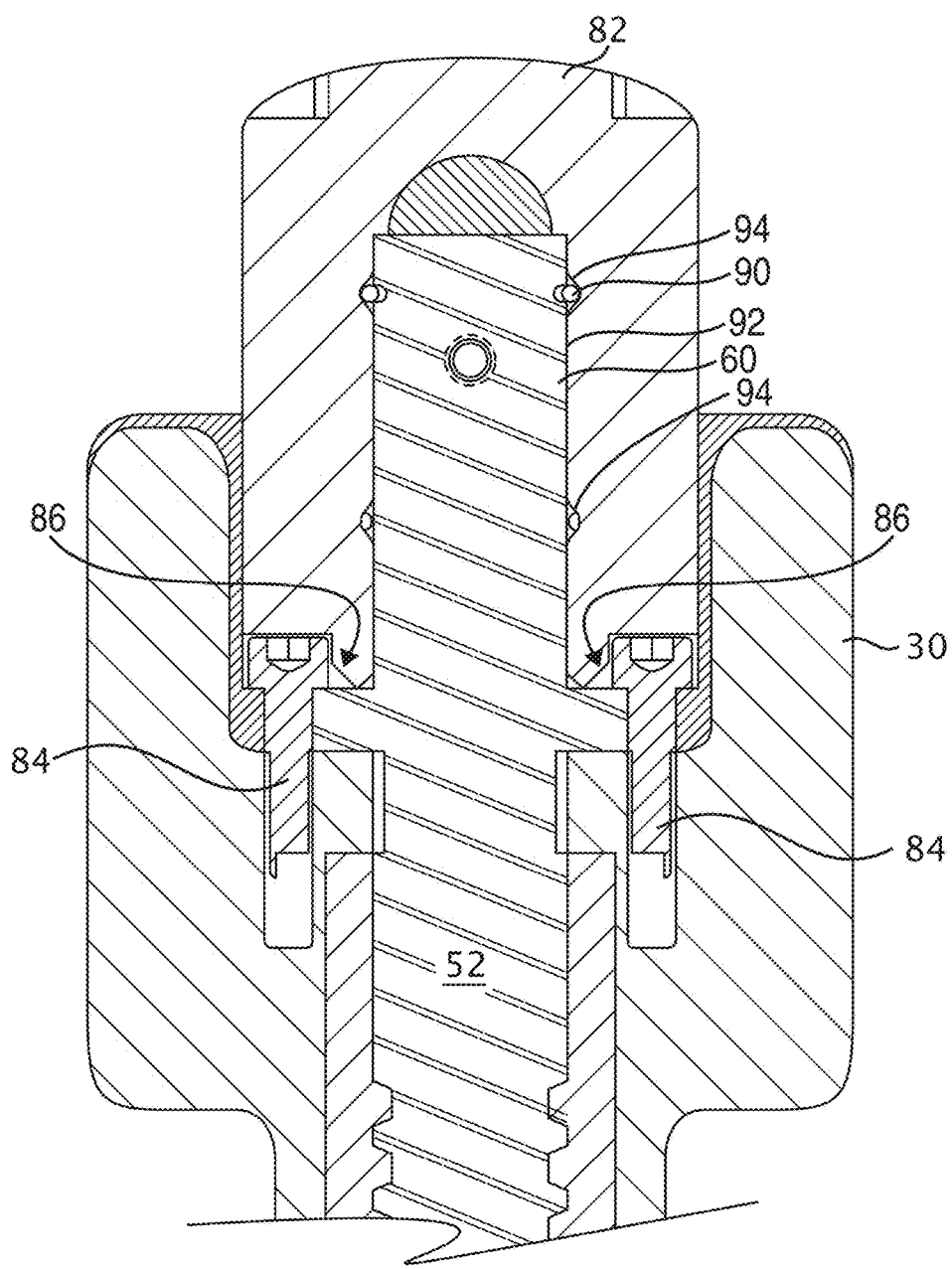
FIG. 4 is a cross-section view of the work holding device shown in FIG. 3 along sectional line A-A.

As shown in FIGS. 1 and 2, and further referring to FIGS. 3 and 4, work holding device 10 includes a handle 80 operatively coupled to spindle 52. In conventional bench-mounted vises, there is not a need for the handle to lock in a specific location; however, for use with a vehicle hitch receiver it is desirable for handle 80 as described herein to be fixed in a locked position to protect handle 80 from undesirable contact and/or damage, such as during vehicle travel. Handle 80 is configured to be fixed in a locked position to facilitate transporting work holding device 10, such as when work holding device 10 is coupled to a vehicle receiver hitch. Handle 80 is also configured to translate with respect to spindle 52 along axis 62 between a first position (away from second jaw piece 30) that allows handle 80 to rotate about axis 62 and a second position (toward second jaw piece 30) that locks handle 80 in the locked position, such as in a 12 o'clock position shown in FIG. 1, for example. As shown in FIGS. 3 and 4, handle 80 includes a socket head 82 seated on one or more socket head cap screws 84 mounted to second jaw piece 30 with handle 80 in the locked position. Socket head 82 defines a chamfered pocket 86 that socket head cap screws 84 self-center on as handle 80 is urged toward the locked position.

In one embodiment, second end 60 of spindle 52 has a rectangular, such as a square, cross-section. Handle 80 defines a corresponding void 88 having a complementary cross-section to receive second end 60 of spindle 52 to facilitate translation of handle 80 between the first position and the second position, and to facilitate a torque transfer when handle 80 is rotated about axis 62 in the first position. As shown in FIG. 4, a snap ring 90 is positioned about at least a portion of an outer surface 92 of second end 60 of spindle 52. Snap ring 90 is compressible when handle 80 is moved between the first position and the second position. Snap ring 90 expands into a corresponding pocket 94 of a plurality of pockets 94 formed within socket head 82 of handle 80, with handle 80 at one of the first position and the second position, to create a positive locating action to notify the user that handle 80 is in the first position or the second position. Further, with snap ring 90 positioned in one of corresponding pockets 94, handle 80 is restricted or prevented from coming disengaged during vehicle travel.

In a further embodiment, socket head 82 defines a void 96, as shown in FIG. 2. A suitably-sized socket head screw 98 extends into void 96 to couple spindle 52 to socket head 82. Socket head screw 98 limits translation of handle 80 along spindle 52 between the first position wherein socket head screw 98 contacts a first portion of a wall forming void 96 and the second position wherein socket head screw 98 contacts an opposing second portion of the wall forming void 96. In one embodiment, handle 80 extends outwardly from axis 62 to a fixed terminal point 100 at a distance 102 from axis 62, as shown in FIG. 2. Unlike sliding handles on conventional bench-mounted vises, by fixing handle 80 at a fixed terminal point 100 in the locked position, handle 80 will not drop down and be at risk for damage.

Figure 5:
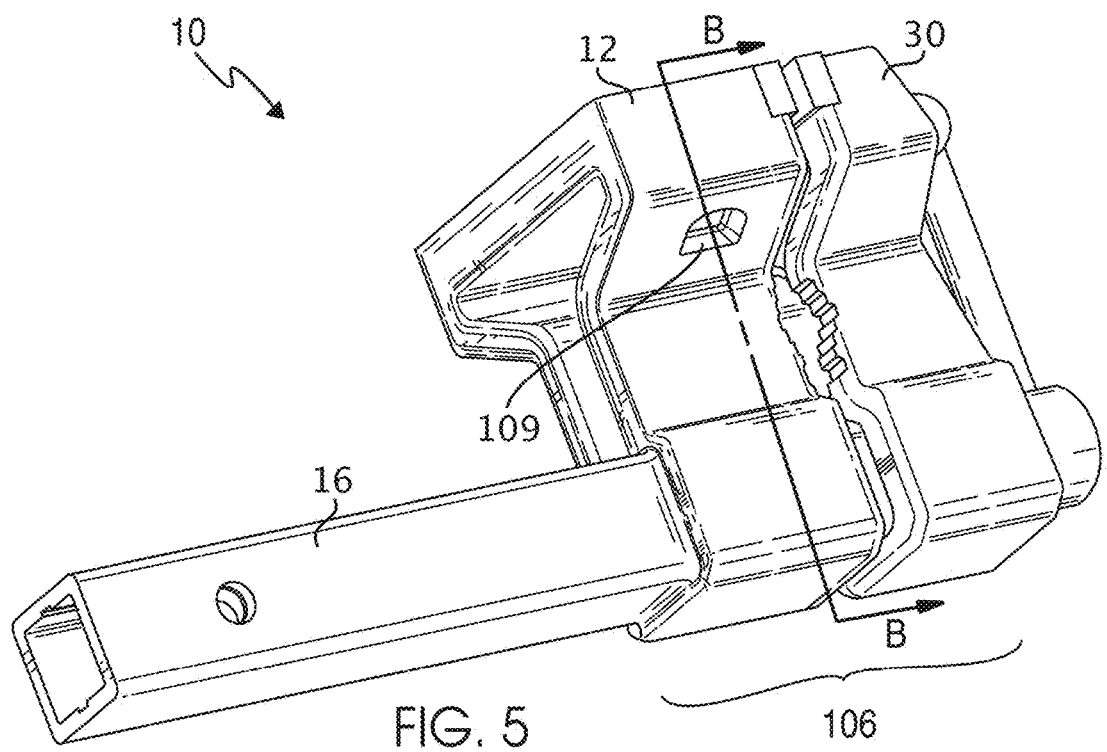
FIG. 5 is a perspective view of the work holding device shown in FIG. 1.
Figure 6:
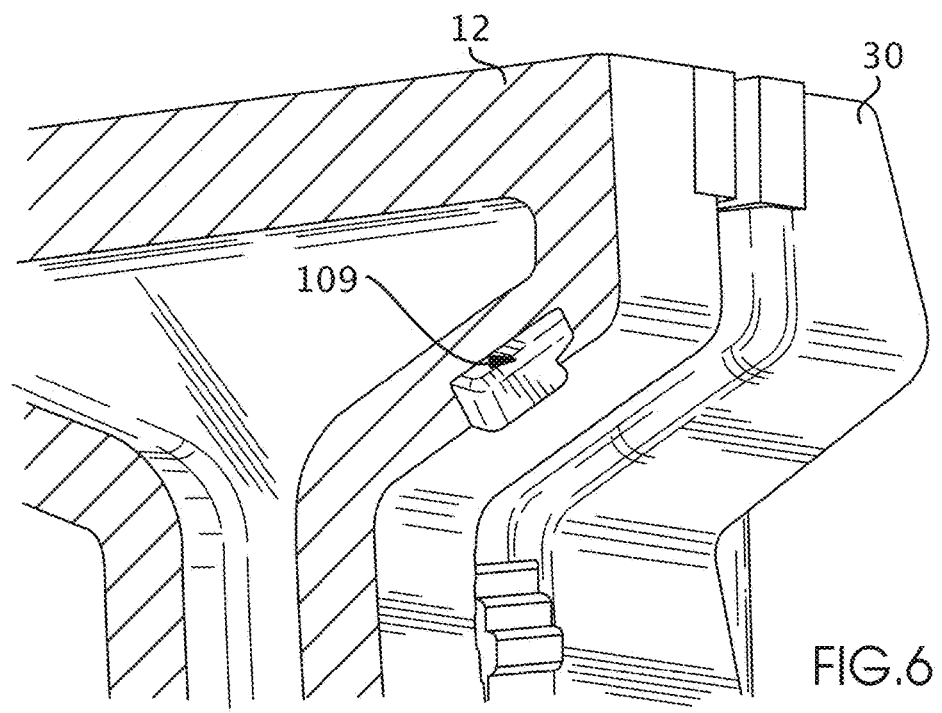
FIG. 6 is a partial cross-section view of the work holding device shown in FIG. 5 along sectional line B-B.

As shown in FIGS. 2 and 5, in one embodiment first jaw piece 12 defines a cored-out back section 104 that provides a handle feature for easily moving, transporting, and mounting portable work holding device 10. Further, the cored-out back section 104 reduces the weight of work holding device 10. A bottom surface 106 of work holding device 10 can be squared off so the user can place work holding device 10 upright on a support surface, such as the ground or a floor. Referring to FIGS. 2, 7 and 8, for example, first jaw piece 12 and/or second jaw piece 30 has an anvil surface 108 raised above first jaw piece 12 and second jaw piece 30 to provide a work surface while mounted to the support. In a certain embodiment, casting 14 defines a recess forming a bottle opener 109, as shown in FIGS. 5 and 6.

Referring now to FIG. 7, first connection member 16 can be inserted into a vehicle receiver hitch 110, and a suitable pin (not shown in FIG. 7) is inserted through aperture 26 and aligned aperture 72 (shown in FIG. 2) to lock first jaw piece 12 and spindle nut 42 to vehicle receiver hitch 110. In one embodiment, first connection member 16 is a two-inch square tube extending from casting 14. The two-inch square tube is inserted into vehicle receiver hitch 110, or an optional plate assembly for mounting on a workbench as described below in reference to FIGS. 8 and 9. In a certain embodiment, a threaded nut is also located on or within the two-inch tube with a hole through which the pin travels to facilitate locking first jaw piece 12 to vehicle receiver hitch 110.

Referring now to FIGS. 8 and 9, a portable work holding device assembly 120 includes work holding device 10 having first jaw piece 12 with elongated first connection member 16 for connecting work holding device 10 to support 18, such as a work surface or work bench. A plate assembly 122 includes a member 124 formed by a plurality of walls 126 defining a passage 128 having a complementary cross-section to receive first connection member 16 to facilitate coupling work holding device 10 to support 18. In one embodiment, one or more brackets 130, such as one or more angle iron pieces or another suitable component, is welded to a corresponding wall 126 of member 124. Bracket 130 defines one or more apertures 132 through a first portion 134 of bracket 130 to facilitate coupling work holding device 10 to support surface 18.

In one embodiment, member 124 is a square tube and bracket 130 includes two 1.25×1.25 angle iron pieces welded to corresponding walls 126 of member 124. Bracket 130 allows for work holding device 10 to be quickly moved from a vehicle receiver hitch 110 to a support 18 simply by pulling the pin, positioning first connection member 16 within member 124, and positioning the pin through an aperture 140 defined through member 124, and aligned aperture 26 of first connection member and aligned aperture 72 of spindle nut 42. Further, a user has the option to couple plate assembly 122 to a desired support 18, such as a work bench, and transport work holding device 10 to the worksite to utilize with vehicle receiver hitch 110.

In one embodiment, a method of assembling a work holding device includes providing a stationary first jaw piece having a casting and an elongated first connection member extending from the casting. The first connection member defines a first passage. An elongated second connection member of a movable second jaw piece is positioned within the first passage to couple the second jaw piece to the first jaw piece. The second connection member defines a second passage in communication with the first passage. A spindle assembly is positioned within the first passage and the second passage to movably couple the second jaw piece to the first jaw piece. In a particular embodiment, positioning the spindle assembly within the first passage and the second passage includes positioning a spindle nut within at least the first passage. The spindle nut forms a helical thread on an inner surface of the spindle nut along at least a portion of a length of the spindle nut between a first end and a second end of the spindle nut. A spindle extends into the second connection member. The spindle forms a helical thread on an outer surface of the spindle along at least a portion of a length of the spindle that cooperates with the helical thread formed on the inner surface of the spindle nut to facilitate translation of the second jaw piece with respect to the first jaw piece along an axis defined by the spindle. The spindle is operatively coupled to the spindle nut.

The described assembly, device, and methods are not limited to the specific embodiments described herein. In addition, components of each assembly and/or device, and/or steps of each method may be practiced independent and separate from other components and method steps, respectively, described herein. Each component and method also can be used in combination with other assemblies, devices, and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A portable work holding device, comprising:
   a first jaw piece having a first jaw surface and an opposite surface;
   a second jaw piece having a second jaw surface directed toward the first jaw surface of the first jaw piece;
   a spindle movably connecting the first jaw piece to the second jaw piece, the spindle being operable to move the first jaw surface and the second jaw surface toward one another to hold a workpiece between the first jaw surface and the second jaw surface; and
   the first jaw piece defining a recess extending into the opposite surface of the first jaw piece, the recess extending toward the first jaw surface, the recess being shaped to provide a handle feature for carrying the portable work holding device.

2. A portable work holding device as claimed in claim 1, wherein the first jaw piece includes a work surface extending generally parallel to the spindle, and wherein the recess providing the handle feature is between the work surface and the spindle.

3. A portable work holding device as claimed in claim 1, wherein the recess in the first jaw piece provides portability for the vise by reducing weight of the vise and by providing a carrying handle for the vise.

4. A portable work holding device, comprising:
   a first jaw piece having a first connection member, the first connection member including a first connecting portion, the first connection member defining a pin receiving opening configured for receiving a locking pin, the pin receiving opening being disposed between the first jaw piece and the first connecting portion, the first connection member defining a hollow interior;
   a spindle nut extending within the hollow interior of the first connection member, the spindle nut including a second connecting portion connected to the first connecting portion of the first connection member;
   a second jaw piece; and
   a spindle movably connecting the first jaw piece to the second jaw piece, the spindle extending into the spindle nut;
   wherein the first connection member is configured for mounting in a vehicle hitch receiver and alternately for mounting in a plate assembly secured on a support surface, the first connection member being selectively secured in the vehicle hitch receiver by the locking pin in the pin receiving opening.

5. A portable work holding device as claimed in claim 4, wherein the locking pin is configured for locking the first connection member in the vehicle hitch receiver and configured for alternately locking the first connection member in the plate assembly.

6. A method of balancing a portable vise for carrying, comprising:
   providing a first jaw member and a second jaw member for holding a workpiece;
   providing the first jaw member with a first work holding surface directed toward the second jaw member, the first work holding surface being a front surface of the first jaw member, the jaw member having a back surface opposite the front surface;
   providing the second jaw member with a second work holding surface directed toward the first jaw member;
   shaping the back surface of the first jaw member with a hollow portion, the hollow portion extending into the back surface in a direction toward the front surface of the first jaw member,
   providing a mounting portion extending from the back surface of the first jaw member, the mounting portion balancing the portable vise for carrying by the hollow portion.

7. A vise for holding a workpiece, comprising:
   a first jaw piece;
   a second jaw piece;
   a spindle connected to the second jaw piece, the spindle being rotatable relative to the second jaw piece and being threadably engaged in the first jaw piece, wherein rotation of the spindle moves the second jaw piece relative to the first jaw piece;
   a handle connected to the spindle, the handle being operable for rotating the spindle;
   a handle lock for locking the handle in a predetermined lock position.

8. A vise as claimed in claim 7, wherein the first and second jaw pieces extend in a first direction from the spindle, the predetermined lock position of the handle positioning the handle so that the handle extends generally in the first direction from the spindle.

9. A vise as claimed in claim 7, wherein the handle lock is operable to lock the handle in the predetermined lock position when in a first position, the handle lock being operable to permit rotation of the handle when in a second position.

10. A portable work holding device, comprising:
    a first jaw piece having a first connection member, the first connection member defining a pin receiving opening;
    a second jaw piece;
    a spindle extending from the second jaw piece into the first connection member of the first jaw piece;
    a spindle nut mounted to the first connection member, the spindle nut threadably engaging the spindle, the spindle nut defining a pin receiving opening in registration with the pin receiving opening of the first connection member; and
    a pin extending into the pin receiving opening of the first jaw piece and into the pin receiving opening of the spindle nut.

11. A vise for holding a workpiece, comprising:
    a first jaw member;
    a second jaw member movably connected to the first jaw member to hold the workpiece between the first jaw member and the second jaw member;

a mounting portion extending from the first jaw;
a spindle extending from the second jaw into the mounting portion;
a spindle nut mounted to the mounting portion, the spindle being threadably received in the spindle nut;
the mounting portion being shaped to fit into a receiver, the mounting portion defining an opening in the mounting portion; and
the spindle nut defining an opening in the spindle nut, the opening in the spindle nut being in registration with the opening in the mounting portion so that a locking pin may be inserted through the opening in the mounting portion and through the opening in the spindle nut to secure the vise in the receiver.

12. A vise for holding a workpiece, comprising:
a first jaw member;
a second jaw member;
a mounting extension extending from the first jaw member, the mounting extension defining a second end opposite a first end connected to the first jaw member;
a spindle extending from the second jaw member into the mounting extension, the spindle being rotatable relative to the mounting extension, the spindle including an exterior thread portion, the spindle having an end connected to the second jaw member and an opposite end;
a spindle nut mounted to the mounting extension, the spindle nut having an interior thread portion and receiving the spindle in threaded engagement, the spindle nut defining an open end in communication with the second end of the mounting extension; and
a stop releasably mounted on the opposite end of the spindle, the stop being selectively releasable by access through the second end of the mounting extension and through the open end of the spindle nut.

13. A vise as claimed on claim 12, wherein the releasable mounting of the stop on the spindle includes a bolt extending into the opposite end of the spindle.

14. A method for locking a vise to a work bench, comprising:
inserting an extension of the vise into a receiver mounted on a work bench, the inserting including moving the vise in a direction substantially parallel to a top working surface of the work bench to insert the extension into a receiving opening of the receiver; and
inserting a locking pin into an opening in the receiver to lock the vise in the receiver on the work bench, the locking pin extending through the extension and through a spindle nut in the extension of the vise.

15. A vise for holding a workpiece, comprising:
a first jaw piece;
a second jaw piece;
a spindle connected between the first jaw piece and the second jaw piece, the spindle being rotatable relative to the first and second jaw pieces and being threadably engaged in the first jaw piece, wherein rotation of the spindle moves the second jaw piece relative to the first jaw piece, the spindle having an axis of rotation;
a handle connected to the spindle, the handle being operable for rotating the spindle;
a coupling between the handle and the spindle, the coupling is configured to enable movement of the handle in a direction along the axis of rotation of the spindle between a first position and a second position, the handle being operable to rotate the spindle so as to move the second jaw piece relative to the first jaw piece when the coupling is in the first position; and a resilient member mounted in the coupling, the resilient member being in a compressed condition during movement of the handle from the first position to the second position, the resilient member being uncompressed in the first position.

16. A vise as claimed in claim 15, wherein the coupling includes a socket engaging an end of the spindle in the first position.

17. A vise as claimed in claim 16, wherein the resilient member extends between the socket and the spindle.

18. A vise as claimed in claim 15, wherein the resilient member exerts a resilient force to maintain the handle in the first position.

19. A vise as claimed in claim 15, wherein the resilient member is a spring.

20. A vise as claimed in claim 19, wherein the spring is a snap ring.

21. A vise as claimed in claim 15, wherein the first position of the handle positions the handle farther from the second jaw piece than a distance between the handle and the second jaw piece at the second position.

22. A vise for holding a workpiece, comprising:
a first jaw piece;
a second jaw piece;
a spindle connected between the first jaw piece and the second jaw piece, the spindle being rotatable relative to the first and second jaw pieces and being threadably engaged in the first jaw piece, wherein rotation of the spindle moves the second jaw piece relative to the first jaw piece, the spindle having an axis of rotation;
a handle connected to the spindle, the handle being operable for rotating the spindle;
a coupling between the handle and the spindle, the coupling is configured to enable movement of the handle in a direction along the axis of rotation of the spindle between a first position and a second position, the handle being operable to rotate the spindle so as to move the second jaw piece relative to the first jaw piece when the coupling is in the first position; and
a spring mounted in the coupling, the spring being in a compressed condition during movement of the handle from the first position to the second position, the spring being uncompressed in the first position.

23. A work holding device, comprising:
a first jaw piece having an elongated first connection member for connecting the work holding device to a support, the first connection member defining a first passage, the first connection member being configured as a generally square elongated tube shaped for mounting in a receiver hitch of a vehicle, the first connection member having a first end at the first jaw piece and a second end;
a second jaw piece having an elongated second connection member positionable within the first passage and defining a second passage, the second connection member having a first end at the second jaw piece and a second end opposite the first end, the second passage being open to the first passage at the second end of the second connection member; and
a spindle assembly movably connecting the second jaw piece to the first jaw piece, the spindle assembly configured to move the second jaw piece with respect to the first jaw piece to create a clamping pressure when an object is placed between the first jaw piece and the second jaw piece, the spindle assembly including a spindle and a spindle nut, the spindle nut being fastened to the elongated first connection member and extending in the first passage of the elongated first connection member, the spindle nut extending into the second passage of the elongated second connection member, the spindle being threadably received in the spindle nut.

24. A portable work holding device as claimed in claim 4, wherein the first jaw piece and the first connection member are formed of a casting.

25. A work holding device as claimed in claim 23, wherein the first jaw piece and the elongated first connection member are formed of a casting.

26. A work holding device, comprising:
- a first jaw piece having an elongated first connection member for connecting the work holding device to a support, the first connection member being configured as a generally square elongated tube shaped for mounting in a receiver hitch of a vehicle, the first connection member having a first end at the first jaw piece and a second end, the first connection member defining a first passage within the first connection member, portions of the first passage being disposed within the receiver hitch when the work holding device is mounted in the receiver hitch;
- a second jaw piece having an elongated second connection member extending within the first passage and defining a second passage, the second connection member having a first end at the second jaw piece and a second end opposite the first end, the second passage being open to the first passage at the second end of the second connection member; and
- a spindle assembly connecting the second jaw piece to the first jaw piece, the spindle assembly configured to move the second jaw piece with respect to the first jaw piece to create a clamping pressure when an object is placed between the first jaw piece and the second jaw piece;
- wherein the elongated second connection member extending within the receiver hitch when the work holding device is mounted in the receiver hitch in at least one position of the second jaw piece.

\* \* \* \* \*